April 7, 1959     C. F. HENDEE ET AL     2,881,327
METHOD AND APPARATUS FOR MAKING X-RAY MEASUREMENTS
Filed Oct. 14, 1955
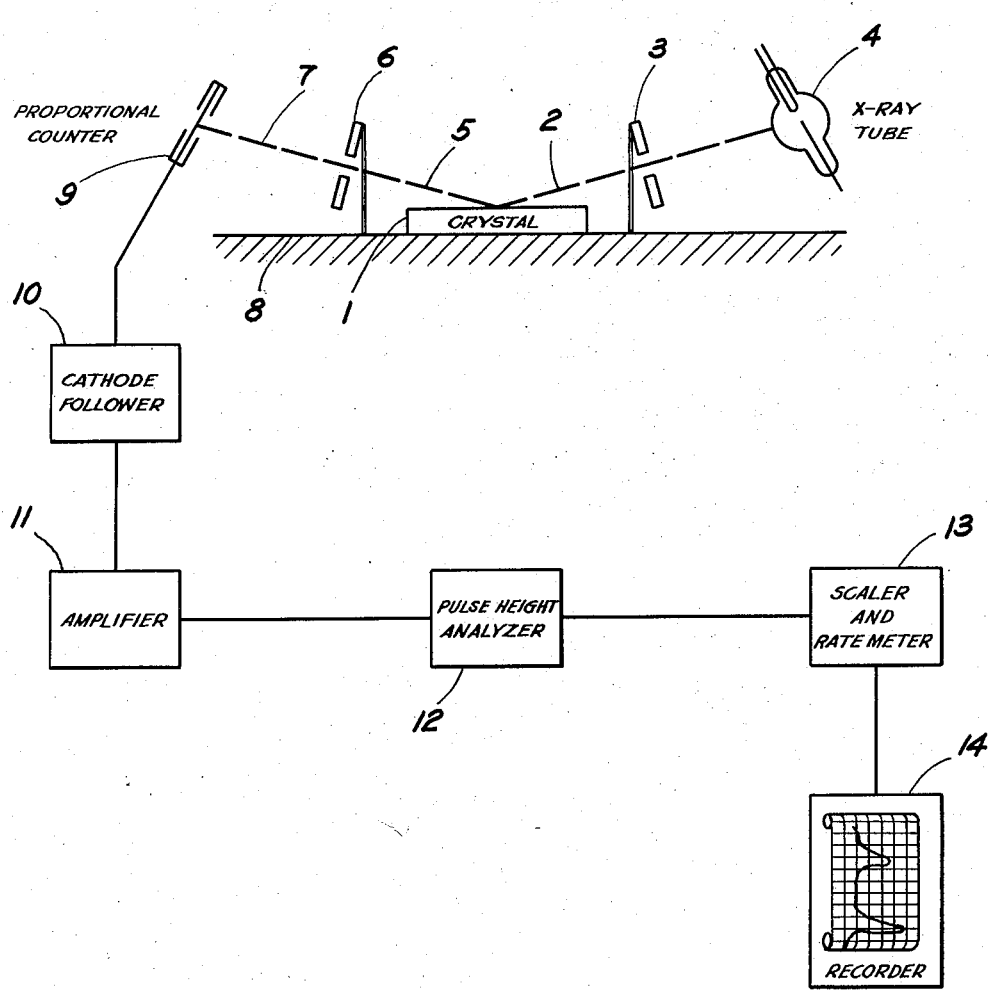
INVENTORS.
CHARLES F. HENDEE
BY    SAMUEL FINE
AGENT.

2,881,327

Patented Apr. 7, 1959

2,881,327

METHOD AND APPARATUS FOR MAKING X-RAY MEASUREMENTS

Charles F. Hendee, Hartsdale, and Samuel Fine, New York, N.Y., assignors to North American Philips Company, Inc., New York, N.Y., a corporation of Delaware Application October 14, 1955, Serial No. 540,375

3 Claims. (Cl. 250—83.3)

Our invention relates to a method and apparatus for making X-ray measurements. In a narrower sense our invention relates to a method and apparatus for making X-ray measurements on and determining the crystal structure of crystalline materials. More particularly our invention relates to a method and apparatus for identifying crystalline materials by means of X-rays.

According to the well known Bragg equation concerning the diffraction of X-rays from crystalline materials $$n\lambda = 2d \sin \theta \quad (1)$$

wherein
$n$ = the order of reflection,
$\lambda$ = the wave length of the incident ray of X-radiation diffracted from a crystalline specimen,
$\theta$ = the angle at which this X-ray of wave length $\lambda$ is diffracted from the specimen, and
$d$ = the distance between parallel planes of atoms in the specimen.

As the distance between parallel planes of atoms or "$d$" values differ with different crystalline materials the "$d$" value is a fingerprint of a specific crystalline material and may be used to identify that crystalline material. In order to determine the value of "$d$" by use of the above-mentioned Bragg equation and thus identify crystalline materials X-ray diffraction techniques have been resorted to.

In order to identify crystalline materials by means of the above Bragg equation conventional X-ray diffraction techniques require a source of monochromatic X-radiation and a rotatable support for the specimen and for the detector in order to measure the diffraction angle at which the diffracted beam has a maximum intensity. For obtaining a monochromatic beam of X-radiation it is usually necessary to employ suitable filters or focussing crystals in order to obtain X-radiation of the desired wave length. When these conventional methods are used it is necessary to rotate the specimen and the detector at twice the angular speed of the specimen, around an axis passing through the specimen and measure the intensity of the diffracted beam at many angles in order to determine the angle at which the diffracted beam has a maximum intensity.

Thus the above method in which a detector is used presents the following difficulties:

(1) The necessity of having precision machinings for moving the specimen and detector accurately into each of a large number of angular positions.

(2) The necessity for making measurements at each of a large number of angular positions and (3) The necessity to use filters or focussing crystals in order to form a monochromatic X-ray beam.

Alternatively, the detector may be replaced by a film which is exposed to the diffracted radiation from the specimen. However, because of shrinkage during processing, this method involves many serious difficulties in measuring interatomic spacings because of the errors introduced by the shrinking.

These prior art methods may also be used to determine the wave length of the diffracted ray if the interatomic spacings of the specimen are known. But here too, the above mentioned difficulties are involved.

A principal object of our invention therefore, is to provide an improved method and apparatus for making X-ray measurements.

A second principal object of our invention is to provide an improved method and apparatus for the identification of crystalline materials by X-ray diffraction means.

Another principal object of our invention is to provide a method and apparatus for X-ray diffraction studies in which no rotation of the specimen or detector is required.

A further object of our invention is to provide a method and apparatus for X-ray diffraction studies in which it is not necessary to employ a monochromatic beam of X-radiation.

A still further object of our invention is to provide a method and apparatus for X-ray diffraction studies in which it is not necessary to use film.

An even further object of our invention is to provide a method and apparatus by which the effects of conditions such as temperature and pressure on the crystalline structure of a specimen may be simply and accurately determined by X-ray diffraction means.

These and further objects of our invention will appear as the specification progresses.

According to our invention we expose a crystalline specimen held at a fixed angle to a polychromatic beam of X-radiation. At a given angle of reflection, the reflected beam, according to the above-noted Bragg equation, is monochromatic and can be detected by means of an energy sensitive device.

By "energy sensitive" devices we mean devices capable of detecting electromagnetic particles or waves and indicating the process of detection by means of a response which is proportional to the photon energy of said waves or particles. Examples of such devices are proportional counters, scintillation counters, cloud chambers, ionization chambers and bubble chambers and other similar devices. Such devices convert the diffracted beam into electrical pulses having amplitudes corresponding to the wave length of the diffracted beam. By counting the number of these pulses in a given amplitude interval and by noting in which amplitude interval the maximum number of counts is obtained, we are able to determine, from the following considerations, the wave length of the diffracted beam without rotating the specimen or the detector.

As the above-noted Bragg equation states:

$$n\lambda = 2d \sin \theta \quad (1)$$

$$\lambda = \frac{K_1}{V} \quad (2)$$

now, wherein V is the photon energy of the diffracted ray in kev, $\lambda$ is given in A., and then $K_1$ is a constant equal to 12,397 (see "Reviews of Modern Physics" 25, 691 (1953)). The mean amplitude of the main pulses M, in volts, is proportional to the energy in kev. of the absorbed photon.

Therefore, $$V = K_2 M \quad (2a)$$

and, substituting in Equation 2, $$\lambda = \frac{K_1}{K_2 M} = \frac{K_3}{M} \quad (3)$$

where $K_3$ is a constant whose value depends on the initial charge generation in the energy-sensitive detector plus the amplification in the detector and in the associated circuits, and $K_3$ is equal to $$\frac{K_1}{K_2}$$

The mean amplitude of the escape pulse E, in volts, for the first order reflection is related $n=1$, to the mean amplitude of the main pulses M in volts, by the equation $$M = E + F \qquad (4)$$

where F is a constant and is proportional to the characteristic X-ray fluorescent energy of the absorbing atoms in the absorbing medium such as the counter gas. Thus, $$E + F = M = \frac{K_3}{\lambda} = \frac{K_3}{2d \sin \theta} \qquad (5)$$

Thus, by measuring either E or M and inserting those values in Equation 5, the constants F and $K_3$ being determined by calibration, it is a simple step to calculate the value of $d$, the interatomic spacing and thus identify the specimen.

The value of $K_3$ may be obtained in several ways. The first and simplest derives from the fact that $$K_3 = \frac{K_1}{K_2}$$

$K_1$ is known as a constant equal to 12.397, and $K_2$ can be obtained by a simple calibration of the counter or energy-sensitive detecting apparatus to relate (Equation 2a) the measured amplitude M of the output pulses to a known incident energy V, which may be obtained from a monochromatic X-ray source. Another way is to calibrate the complete instrument by measuring the pulse amplitude M resulting from detecting the diffracted ray from a known crystal with a known $d$-spacing. Since $\theta$ is fixed by the instrument geometry, $K_3$ can be calculated (Equation 5) for the instrument as a whole and will remain constant so long as the amplification of the detector and circuits are unchanged.

In a preferred embodiment of our invention, we employ a proportional or scintillation counter which produces main and escape pulses having amplitudes proportional to wave length. Escape pulses have a lower energy content and consequently a smaller half-width of the pulse-height distribution. Thus, the escape pulses afford a more accurate means for determining the energy of the reflected X-ray and we therefore prefer to use escape rather than main pulses in the preferred embodiment of our invention. Our copending application Serial No. 447,054, filed August 2, 1954, describes in detail the meaning of the main and escape pulses in a proportional counter, and also describes what is meant by the characteristic X-ray fluorescent energy. Similar considerations apply to scintillation centers.

The method and apparatus of our invention also may be used to measure small changes in $d$, or $\lambda$ at constant $\theta$. Here too, we prefer to measure the escape pulses because of the resultant greater accuracy. In fact if the change to be determined is sufficiently small, only the resolution in the escape pulses is enough to enable us to measure the change.

In the preferred embodiment of our invention we count only escape pulses and we prefer using a proportional counter as the escape pulses in the proportional counter are much better defined than the escape pulses in the scintillation counter, thus yielding more accurate results.

In order to facilitate the counting of the number of pulses in a given amplitude interval, we prefer to employ means to separate pulses of different amplitudes such as a multi-channel pulse height analyzer and quantize the pulses to eliminate statistical errors resulting from pulses of varying amplitudes in a given interval. Thus, by recording and counting the number of pulses in a given time and amplitude interval, a more accurate determination of the wave length of the diffracted X-ray beam is obtained.

As the source of X-radiation we may use any X-ray tube or other source of X-radiation such as radio isotopes.

The invention will now be described with reference to the accompanying drawing which shows an apparatus for carrying out the method according to our invention.

In the drawing a crystal specimen 1 is exposed to the polychromatic radiation 2 collimated by collimator 3 and generated by an X-ray tube having a target 4. The X-ray beam 2, diffracted from the specimen at a fixed angle $\theta$ into X-ray beam 5 is collimated by collimator 6 into beam 7. The specimen and both collimators are fixed to a base 8. From collimator 6, beam 7 enters a proportional counter 9 which comprises a chamber having a window through which the radiation enters, a pair of electrodes and an ionizable medium which in this case is xenon. Our copending application, Serial No. 404,524, filed January 18, 1954, now U.S. Patent 2,837,677, describes a suitable proportional counter. A suitable potential is applied between the electrodes so that when the entering radiation ionizes the medium, main pulses with amplitudes proportional to the energy of the radiation and escape pulses proportional to the incident energy minus the fluorescent energy of the counter gas are formed. The output of the proportional counter is coupled by means of a cathode follower 10 and an amplifier 11 to a pulse height analyzer 12 set to be responsive only to the escape pulses generated in the counter and which separates pulses of different amplitudes into groups having definite amplitude intervals.

By means of appropriate but conventional scaling circuits such as a scaler and rate meter 13, the number of pulses in each amplitude interval is separately counted and recorded on a strip-chart recorder 14.

For example, with a mean amplitude of the escape peak, as measured with a proportional counter having a xenon filling, of 4.8 kev., the energy of the beam 5 diffracted at the fixed angle $\theta$ of 7.49 degrees is 34.6 kev. The value of $d$, the interatomic spacing in the specimen, is, from Eq. 5, found to be 1.375 angstroms. This value of $d$ corresponded to the value of $d$ for quartz thus identifying the specimen.

By counting the escape pulses and noting the shift in amplitude position of the peak, we may also determine the effect of a slight change of temperature, pressure, or other environmental changes on the value of the interatomic spacings. In this case, in addition to employing the above described method and apparatus, the specimen is enclosed in a chamber which permits the pressure and temperature to which the specimen is exposed to be varied.

The effect of changes of temperature on the interatomic spacings of a specimen such as the one above can then be calculated from the following considerations:

Since $$n\lambda = 2d \sin \theta \qquad (1)$$

and $$\lambda = \frac{K_1}{V} \qquad (2)$$

$$nK_1 = 2dV \sin \theta \qquad (6)$$

Taking the derivative of Equation 6 with respect to V at constant $\theta$ we obtain the following equation:

$$0 = 2 \sin \theta \left[ d + V \frac{\delta d}{\delta V} \right] \qquad (7)$$

Therefore $$V \frac{\delta d}{\delta V} = -d$$

or $$\frac{\delta d}{\delta v} = \frac{-d}{V} \quad (8)$$

or $$\delta d = \frac{-d}{V}\delta v \quad (9)$$

By substituting in Equation 9 the values of V and d obtained in the above example and by using an analyzer which is able to resolve within 0.1 kev. in the escape region so that ($\delta V=.1$) we see that $$\delta d = \frac{1.375}{34.57}(0.1) = .003916 \text{ A.}$$

which is a small change in d that we are able to measure by means of escape pulses.

It will thus be seen that our apparatus and method is useful not only in making X-ray measurements of a crystalline substance and thereby identifying said substance but also in measuring changes in crystal structure caused by changes in environmental conditions.

While we have described our invention in connection with specific embodiments and applications, other modifications thereof will be readily apparent to those skilled in this art without departing from the spirit and scope of the invention as defined in the appended claims.

What we claim is:
1. A method of making X-ray measurements comprising the steps of exposing a crystalline specimen held at a fixed angle to a polychromatic beam of X-radiation, detecting the diffracted X-radiation with an energy sensitive device to thus produce electrical pulses having amplitudes corresponding to the wave length of said diffracted X-radiation, and measuring the amplitudes of said pulses to thereby determine the wave length of said diffracted X-radiation and the interatomic spacings within said specimen.

2. A method of making X-ray measurements comprising the steps of exposing a crystalline specimen held at a fixed angle to a polychromatic beam of X-radiation, detecting and producing from the X-radiation diffracted by said specimen main and escape electrical pulses having amplitudes corresponding to the wave length of said diffracted X-radiation, and counting the number of escape pulses per amplitude interval to determine thereby the wave length of the diffracted X-radiation and the interatomic spacings within said specimen.

3. A method of making X-ray measurements comprising the steps of exposing a crystalline specimen held at a fixed angle to a polychromatic beam of X-radiation, detecting and producing from the X-radiation diffracted by said specimen main and escape electrical pulses having amplitudes corresponding to the wave length of said diffracted X-radiation, separating said escape pulses into given amplitude intervals, and counting the number of escape pulses per amplitude interval to determine thereby the wave length of the diffracted X-radiation and the interatomic spacings within said specimen.

References Cited in the file of this patent

UNITED STATES PATENTS

| | | |
|---|---|---|
| 2,386,785 | Friedman | Oct. 16, 1945 |
| 2,449,066 | Friedman | Sept. 14, 1948 |
| 2,474,835 | Friedman | July 5, 1949 |
| 2,610,303 | Bell | Sept. 9, 1952 |
| 2,616,052 | Hurst | Oct. 28, 1952 |
| 2,642,537 | Carroll et al. | June 16, 1953 |

FOREIGN PATENTS

| | | |
|---|---|---|
| 404,808 | Germany | Oct. 21, 1924 |

OTHER REFERENCES

"Elements of X-ray Diffraction," by B. D. Cullity, copyright Sept. 7, 1956, Addison-Wesley Publishing Co., Reading, Mass.; page 89.